Figure 1:
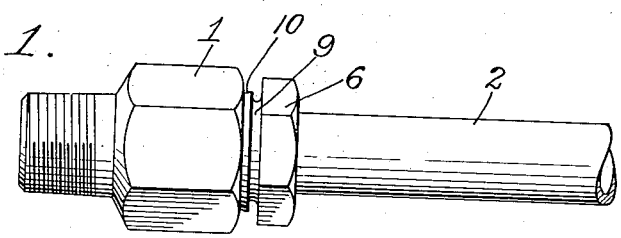

July 19, 1938.  R. J. LAUER  2,123,999
PIPE COUPLING
Filed Sept. 14, 1936

Inventor
Raymond J. Lauer
by Parker & Carter
Attorneys.

Patented July 19, 1938

2,123,999

UNITED STATES PATENT OFFICE 2,123,999

PIPE COUPLING

Raymond J. Lauer, Chicago, Ill., assignor to The Dole Valve Company, Chicago, Ill., a corporation of Illinois Application September 14, 1936, Serial No. 100,614

4 Claims. (Cl. 285—86)

This invention relates to pipe couplings and has for its object to provide a new and improved device of this description.

The invention has as a further object to provide a pipe coupling where the strain on the flared end of the pipe in the coupling is such that the pipe will not break at the point where it is flared, due to vibration of the parts when in use. The invention has as a further object to provide a pipe coupling so constructed that the pipe does not break at a point inside the body of the coupling, due to vibration when the device is in use.

In manufacturing certain pipes which are used in pipe couplings, there is often a variation in diameter of as much as plus or minus .003 of an inch, and in the manufacture of the nuts for the couplings, there is often a variation of as much as plus or minus .002 of an inch. The invention has as a further object to provide a coupling construction whereby these variations are taken care of when the coupling is made and the nut tightly engages the pipe.

The invention has as a further object to provide a construction of this kind, wherein the nut is elastically compressed to elastically compress it to the pipe, the nut returning to its original size when the coupling is uncoupled, so that the coupling can be used over and over again.

The invention has as a further object to produce a coupling with means for compressing one of the coupling members to cause it to engage the pipe without changing the external diameter of the pipe. The invention has as a further object to provide a pipe coupling which does not produce an inward bend of the pipe so as to reduce its internal diameter. The invention has as a further object to provide a pipe coupling wherein the flared end of the pipe has a double curvature in the nature of an S curve. The invention has as a further object to provide an improved two-piece pipe coupling device.

The invention has as a further object to provide a pipe coupling for pipes with flared ends, which increases the life of the pipe. When the end of a pipe is flared, the metal is bent and this reduces the ability of the metal to withstand crystallization at this point. One of the objects of the present invention is to provide a coupling for pipes with flared ends, with means for preventing the flexing of the pipe at the point where it has been bent to produce the flared end, due to vibration of the parts, and therefore prevent crystallization of the metal at this point, which would cause breaking of the pipe at this point.

The invention has further objects which are more particularly pointed out in the accompanying description.

Figure 2:
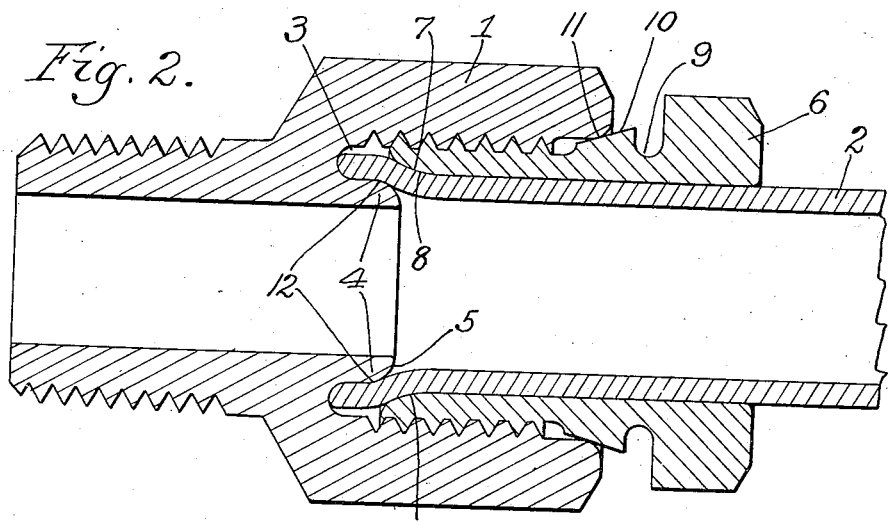
Figure 3:
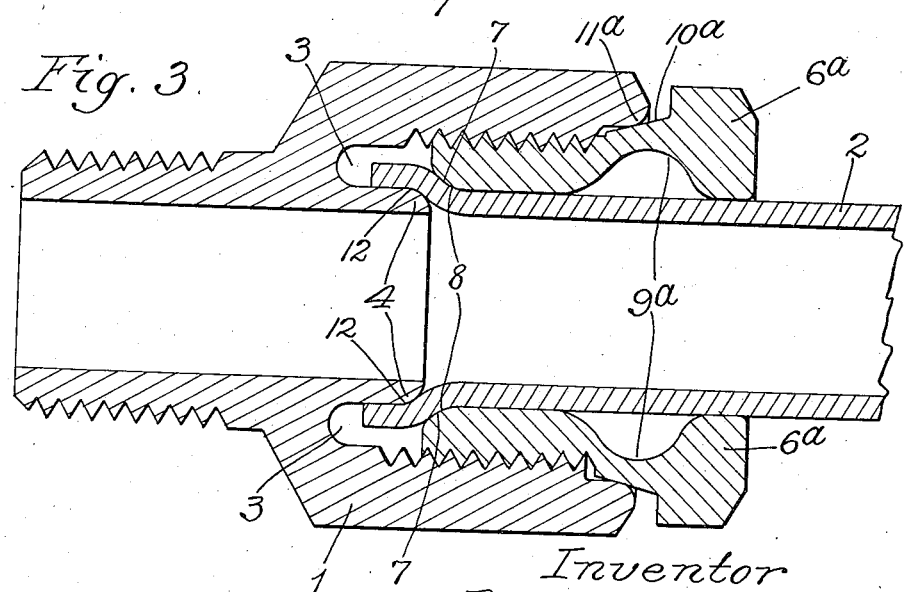

Referring now to the drawing, Fig. 1 is a view of one form of coupling embodying the invention;

Fig. 2 is a longitudinal sectional view through the coupling shown in Fig. 1; and Fig. 3 is a longitudinal sectional view showing a modified construction.

Like numerals refer to like parts throughout the several figures.

Referring now to the drawing, there is illustrated in Figs. 1 and 2 a pipe coupling wherein there is a body portion 1, into which the pipe 2 is received. The body portion 1 is provided with the recess 3 into which the end of the pipe is received, the end of the pipe surrounding the inwardly projecting part 4 of the body portion. The end of the part 4 is preferably rounded off, as shown at 5. The interior of the body portion is screwthreaded and the nut 6, which is screwthreaded exteriorly, is inserted in the body portion 1 and surrounds the pipe 2, as clearly shown in Fig. 2. The inner end of the nut 6 is arranged to engage the flared end of the pipe 2 and move it forward against the wall of the recess 3, and compress it to cause it to tightly clamp the inwardly projecting part 4. This result is secured by either flaring the inner end of the nut 6 or by giving it a curved surface. This curved surface, shown at 7, engages the curved surface 8 of the flared end of the pipe so that the pressure between the nut and the pipe, which compresses the end of the pipe to form a tight joint with the body portion of the coupling, is along a curved surface, as clearly shown in Fig. 2.

Some means is provided for causing the nut to tightly clamp the pipe so that the pipe cannot vibrate inside of the body portion. In Figs. 1 and 2 this result is secured by reducing the amount of material in the nut, at a point between its ends, as shown, for example, by forming a groove 9 therein, and providing in proximity to the reduced portion of the nut a compression contact between the nut and the body portion, which compresses the nut when it is screwed into the body portion and which may consist of an inclined engaging face 10 on one or the other, or both, of the parts, it being shown in this instance as upon the nut, which engages a face 11 of the body portion, the parts being so arranged that as the nut is screwed into the body portion, pressure will be applied to the nut in proximity to the groove 9 and the nut compressed so as to reduce its diameter and cause it to clamp the pipe 2.

By means of this construction, the nut is elastically compressed to elastically clamp the pipe, so that when the nut is unscrewed it will return to its original position and diameter, so that the coupling can be loosened and tightened many times without detracting from the tightness of the coupling when properly made. This elastic compression of the nut upon the pipe appears to be due to the reduction of the metal in the nut in proximity to the point where the body portion compresses the nut, that is, in proximity to the point where the inclined face 10 engages the body portion.

In Fig. 3 I have shown a modified construction. In this construction the body portion 1 is substantially the same as shown in Figs. 1 and 2 and the pipe 2 is provided with the flared end having a double curvature and which projects into the recess 3 in the body portion and surrounds the inwardly projecting part 4 of the body portion. The nut 6a is modified to the extent that, whereas in Figs. 1 and 2 the groove 9 is on the exterior of the nut, in Fig. 3 the nut is provided with a groove 9a on the interior thereof, but in proximity to the inclined face 10a, which is engaged by the face 11a on the body portion when the nut is tightened.

In these various constructions, when the pipes are inserted in the nuts, they are more or less loose therein and when the pipes and nuts are placed in the body portions and the nuts screwed up, the nuts are elastically compressed so as to elastically clamp the pipes to prevent vibration of the pipes within the couplings.

By means of this device, the pipe is prevented from flexing or vibrating at the flared end where the sealing joint is made. Since the flaring of this end weakens the material of the pipe, so it crystallizes easily and quicker, due to vibration, it will be seen that this device which prevents the vibration or flexing of the pipe at this weakened point, prevents crystallization at this point. Since crystallization at any other point would not occur as soon as at this weakened point, it will be seen that this device lengthens the life of the pipe.

It will further be seen that the nut and the body have a compression contact, at the points 11 and 12, at a distance from the flared end of the pipe and that this compression contact compresses the nut so as to make it tightly clamp the pipe, and this is done without changing the outer diameter of the pipe or in any manner roughening it or breaking its surface. This is an important factor in the life of the pipe and also in maintaining the maximum diameter of the pipe through the coupling.

It will further been seen that in this construction the nut acts at one end to engage the pipe and press it against the projection 4, so as to form a sealed joint, and that this same nut also tightly compresses the pipe at a point at a distance from the point where the sealed joint is made. This construction, therefore, not only makes the sealed joint without mutilating the pipe, but also insures a tight hold of the pipe in the coupling and a tight union between the two members of the coupling. It will further be seen that by making the flared end of the pipe in the form of an S curve, that is a double curve with reverse radii, as herein illustrated, a sound, tight, unbreakable joint is made between the pipe and the coupling member.

It will be noted that in this construction there are two parts threaded together and into which the pipe is received, with means for making a sealing connection between one end of the pipe and both of said parts, and there is also means for compressing one of said parts so that it clamps the pipe at a point at a distance from the point where the sealing connection is made.

I claim:

1. A pipe coupling comprising a body portion, interiorly threaded and having a recess into which the end of the pipe is received, a nut surrounding the pipe and having a threaded engagement with the body portion, a compression contact between the nut and the body portion for compressing the nut about the pipe when it is moved into the body portion, the material in the nut in proximity to said compression contact being reduced.

2. A pipe coupling comprising a body portion, interiorly threaded and having a recess into which the end of the pipe is received, a projecting part surrounded by said recess and which extends into the end of the pipe, the end of the pipe having a flared end formed by a double curvature, and a nut threaded into the body portion and adapted to engage the flared portion of the pipe and compress it around said projecting part, the nut near its outer end, having a compression contact with the body portion, the material in the nut in proximity to said compression contact being reduced.

3. A pipe coupling comprising a body portion having an interior thread and being provided with a recess into which the end of the pipe is received, a projecting part of the body portion surrounded by said recess and which extends into the end of the pipe, the pipe having a flared end formed by a double curvature, and a nut threaded into the body portion, the inner end of the nut engaging the pipe at a point back of the end of the pipe, a substantial portion of the end of the pipe, when the nut is screwed in, being out of engagement with said nut and extending in a direction generally parallel to the body of the pipe.

4. A pipe coupling comprising a body portion having an interior thread and being provided with a recess into which the end of the pipe is received, a projecting part on the body portion surrounded by said recess and which extends into the end of the pipe, the pipe having a flared end formed by a double curvature, and a nut threaded into the body portion, the inner end of the nut engaging the pipe at a point back of the end of the pipe, a substantial portion of the end of the pipe, when the nut is screwed in, being out of engagement with said nut and extending in a direction generally parallel to the body of the pipe, the end face of the pipe engaging the end wall of said recess.

RAYMOND J. LAUER.